US009054560B2

(12) United States Patent
Fujiwara

(10) Patent No.: US 9,054,560 B2
(45) Date of Patent: Jun. 9, 2015

(54) POWER GENERATING APPARATUS

(71) Applicant: JTEKT CORPORATION, Osaka-shi, Osaka (JP)

(72) Inventor: Hideki Fujiwara, Kitakatsuragi-gun (JP)

(73) Assignee: JTEKT CORPORATION, Osaka-shi (JP)

( * ) Notice: Subject to any disclaimer, the term of this patent is extended or adjusted under 35 U.S.C. 154(b) by 273 days.

(21) Appl. No.: 13/861,479

(22) Filed: Apr. 12, 2013

(65) Prior Publication Data
US 2013/0278100 A1 Oct. 24, 2013

(30) Foreign Application Priority Data

Apr. 19, 2012 (JP) .................................. 2012-095612
Oct. 19, 2012 (JP) .................................. 2012-231728

(51) Int. Cl.
| | | |
|---|---|---|
| H02K 7/10 | (2006.01) | |
| H02K 7/116 | (2006.01) | |
| H02K 7/08 | (2006.01) | |
| H02K 7/108 | (2006.01) | |
| F03D 11/02 | (2006.01) | |
| F16D 41/067 | (2006.01) | |
| F16D 43/14 | (2006.01) | |

(52) U.S. Cl.
CPC .................. *H02K 7/08* (2013.01); *H02K 7/108* (2013.01); *F03D 11/02* (2013.01); *F16D 41/067* (2013.01); *F05B 2260/4023* (2013.01); *Y02E 10/722* (2013.01); *F16D 43/14* (2013.01)

(58) Field of Classification Search
USPC ................ 74/665 R; 310/90, 78; 192/45.001; 290/53, 54
See application file for complete search history.

(56) References Cited

U.S. PATENT DOCUMENTS

| | | |
|---|---|---|
| 3,469,473 A | 9/1969 | Forster et al. |
| 4,461,957 A | 7/1984 | Jallen |
| 4,464,579 A | 8/1984 | Schwarz |

(Continued)

FOREIGN PATENT DOCUMENTS

| | | |
|---|---|---|
| DE | 102004040810 A1 | 3/2006 |
| DE | 10 2009 004 991 A1 | 7/2010 |

(Continued)

OTHER PUBLICATIONS

Extended European Search Report issued in European Patent Application No. 12183632.4 dated Jan. 11, 2013.

(Continued)

*Primary Examiner* — Ha D Ho
(74) *Attorney, Agent, or Firm* — Oliff PLC

(57) ABSTRACT

A wind power generator includes: an input rotor provided so as to be rotatable together with an output shaft of a speed increaser; an output rotor provided so as to be rotatable together with a drive shaft of a generator; and a one-way clutch arranged between the input and output rotors. The one-way clutch connects the input rotor to the output rotor such that the input rotor and the output rotor are rotatable together with each other when a rotation speed of the input rotor exceeds a rotation speed of the output rotor, and that disconnects the input rotor from the output rotor when the rotation speed of the input rotor falls below the rotation speed of the output rotor. The one-way clutch has a rotation speed limiter that disconnects the input rotor from the output rotor when the rotation speed of the output shaft exceeds a predetermined value.

19 Claims, 9 Drawing Sheets

(56) References Cited

U.S. PATENT DOCUMENTS

| | | | |
|---|---|---|---|
| 4,613,763 A * | 9/1986 | Swansen | 290/44 |
| 5,281,094 A * | 1/1994 | McCarty et al. | 416/147 |
| 6,856,042 B1 | 2/2005 | Kubota | |
| 7,309,930 B2 * | 12/2007 | Suryanarayanan et al. | 290/55 |
| 7,595,566 B2 * | 9/2009 | Nitzpon et al. | 290/55 |
| 2008/0284168 A1 | 11/2008 | Arduini | |
| 2009/0278361 A1 | 11/2009 | Okubo et al. | |
| 2010/0294585 A1 | 11/2010 | Wolff et al. | |
| 2011/0077120 A1 | 3/2011 | Dirk | |
| 2012/0020792 A1 | 1/2012 | Frank | |
| 2012/0045335 A1 | 2/2012 | Heidenreich et al. | |
| 2012/0201679 A1 | 8/2012 | Heidenreich et al. | |
| 2013/0278100 A1 | 10/2013 | Fujiwara | |
| 2013/0283949 A1 | 10/2013 | Fujiwara | |
| 2014/0090945 A1 | 4/2014 | Fujiwara et al. | |

FOREIGN PATENT DOCUMENTS

| | | |
|---|---|---|
| DE | 20 2010 012 597 U1 | 2/2011 |
| EP | 2 302 257 A2 | 3/2011 |
| JP | S55-66669 A | 5/1980 |
| JP | A-6-307327 | 11/1994 |
| JP | A-2006-250034 | 9/2006 |
| JP | A-2007-232186 | 9/2007 |
| JP | A-2013-238309 | 11/2013 |
| SU | 1 574 899 A1 | 6/1990 |
| WO | WO 2005/012763 A1 | 2/2005 |
| WO | WO 2012/023994 A1 | 2/2012 |

OTHER PUBLICATIONS

U.S. Appl. No. 13/606,695, filed Sep. 7, 2012 in the name of Fujiwara et al.
Extended European Search Report issued in European Patent Application No. 13 18 7006.5 dated Mar. 21, 2014.
U.S. Appl. No. 14/041,078, filed Sep. 30, 2013 in the name of Fujiwara et al.
Jul. 1, 2014 Office Action issued in U.S. Appl. No. 13/606,695.
Jan. 23, 2015 Office Action issued in U.S. Appl. No. 14/041,078.
Sep. 9, 2014 Office Action issued in U.S. Appl. No. 14/041,078.
Feb. 19, 2015 Search Report issued in European Application No. 13163899.1.

* cited by examiner

POWER GENERATING APPARATUS

INCORPORATION BY REFERENCE

The disclosure of Japanese Patent Applications No. 2012-095612 filed on Apr. 19, 2012 and 2012-231728 filed on Oct. 19, 2012 including the specification, drawings and abstract, is incorporated herein by reference in its entirety.

BACKGROUND OF THE INVENTION

1. Field of the Invention

The invention relates to a power generating apparatus in which the speed of rotation caused by external force and transmitted from a main shaft is increased by a speed increaser to drive a generator.

2. Description of Related Art

In some conventional wind power generators, a main shaft connected to blades is rotated upon reception of wind force and the speed of rotation transmitted from the main shaft is increased by a speed increaser to drive a generator. As shown in FIG. 9, a speed increaser 202 includes a planetary gear mechanism 203, a high-speed gear mechanism 204 and an output shaft 205. The planetary gear mechanism 203 receives rotation from a main shaft 200 and increases the speed of the rotation. The high-speed gear mechanism 204 receives the rotation of which the speed has been increased by the planetary gear mechanism 203 and further increases the speed of the rotation. The output shaft 205 outputs rotary torque of the high-speed gear mechanism 204.

In the planetary gear mechanism 203, when an input shaft 203a, which is coupled to the main shaft 200 so as to be rotatable together with the main shaft 200, rotates, a planetary carrier 203b is rotated and, as a result, a sun gear 203d is rotated at an increased speed via planetary gears 203c, and the rotation of the sun gear 203d is transmitted to a low-speed shaft 204a of the high-speed gear mechanism 204. In the high-speed gear mechanism 204, when the low-speed shaft 204a rotates, an intermediate shaft 204d is rotated at an increased speed via a low-speed gear 204b and a first intermediate gear 204c, and an output shaft 205 is rotated at a further increased speed via a second intermediate gear 204e and a high-speed gear 204f. Roller bearings 206 to 211 are used as bearings by which the low-speed shaft 204a, the intermediate shaft 204d and the output shaft 205 of the speed increaser 202 are rotatably supported (see, for example, Japanese Patent Application Publication No. 2007-232186 (JP 2007-232186 A)).

The wind power generator includes a blade adjustment mechanism. When a wind force that acts on the blades becomes larger than or equal to a predetermined value due to a typhoon, gusty strong wind, or the like, the blade adjustment mechanism prevents the rotation speed of the main shaft 200 from reaching and exceeding a predetermined rotation speed by pivoting each blade about its axis to reduce the wind receiving area of each blade.

The conventional wind power generator has a problem that, in the roller bearings that support the output shaft that rotates at a high speed, smearing (phenomenon that surface seizure occurs) may occur at a rolling surface of a roller or a raceway surface of a rotary ring and, as a result, the service life of each roller bearing may decrease. In addition, if the blade adjustment mechanism malfunctions, a drive shaft of the generator may rotate at a high speed (abnormal rotation of the drive shaft may occur), and a sliding portion, such as a brush, of the generator may abnormally abrade or may break.

SUMMARY OF THE INVENTION

It is an object of the invention to provide a power generating apparatus configured such that occurrence of smearing at a roller bearing that supports an output shaft of a speed increaser is effectively suppressed and abnormal rotation of a drive shaft of a generator is prevented.

The inventor of the present application has diligently conducted research on the mechanism of occurrence of smearing. As a result, the inventor found the following fact. When the rotation speed of a main shaft steeply decreases due to a decrease in wind force, the rotation speed of a drive shaft of a generator becomes higher than the rotation speed of the output shaft due to the inertia of a rotor of the generator having a heavy weight. Thus, a torque drop (load drop) occurs, and radial load that acts on a rolling bearing that supports the output shaft decreases due to the torque drop. As a result, sliding friction resistance, and the like, between rollers of the roller bearing and a cage that retains the rollers becomes larger than rolling friction resistance between the rollers and a rotary ring and, consequently, rotation of each roller delays. Then, the inventor obtained the following finding. When the rotation speed of the main shaft steeply increases from this state due to an increase in wind force, speed-increasing inertia torque is added, and radial load that acts on the roller bearing that supports the output shaft increases. Therefore, at this instance, the rollers slide at the contact surfaces with the rotary ring in a state where high load acts on the rollers. Thus, the temperature of the contact surfaces rises and, as a result, smearing occurs. On the basis of this finding, the invention of the present application is completed.

An aspect of the invention relates to a power generating apparatus including: a main shaft that is rotated by external force; a speed increaser that has a rotation transmission mechanism that receives rotation of the main shaft and that increases a speed of the rotation and a roller bearing that supports an output shaft, which outputs rotary torque of the rotation transmission mechanism, such that the output shaft is rotatable; and a generator that has a drive shaft that rotates upon reception of rotation of the output shaft and that generates electric power due to rotation of a rotor that rotates together with the drive shaft. The power generating apparatus further includes: an input rotor provided so as to be rotatable together with the output shaft; an output rotor provided so as to be rotatable together with the drive shaft and arranged concentrically with and radially inward or radially outward of the input rotor; a one-way clutch that is arranged between the input rotor and the output rotor, that connects the input rotor and the output rotor to each other such that the input rotor and the output rotor are rotatable together with each other in a state where a rotation speed of the input rotor is higher than a rotation speed of the output rotor, and that disconnects the input rotor and the output rotor from each other in a state where the rotation speed of the input rotor is lower than the rotation speed of the output rotor; and a rotation speed limiter that disconnects the input rotor and the output rotor from each other when the rotation speed of the output shaft exceeds a predetermined value in a state where the input rotor and the output rotor are connected to each other.

BRIEF DESCRIPTION OF THE DRAWINGS

The foregoing and further features and advantages of the invention will become apparent from the following descrip

DETAILED DESCRIPTION OF EMBODIMENTS

Figure 1:
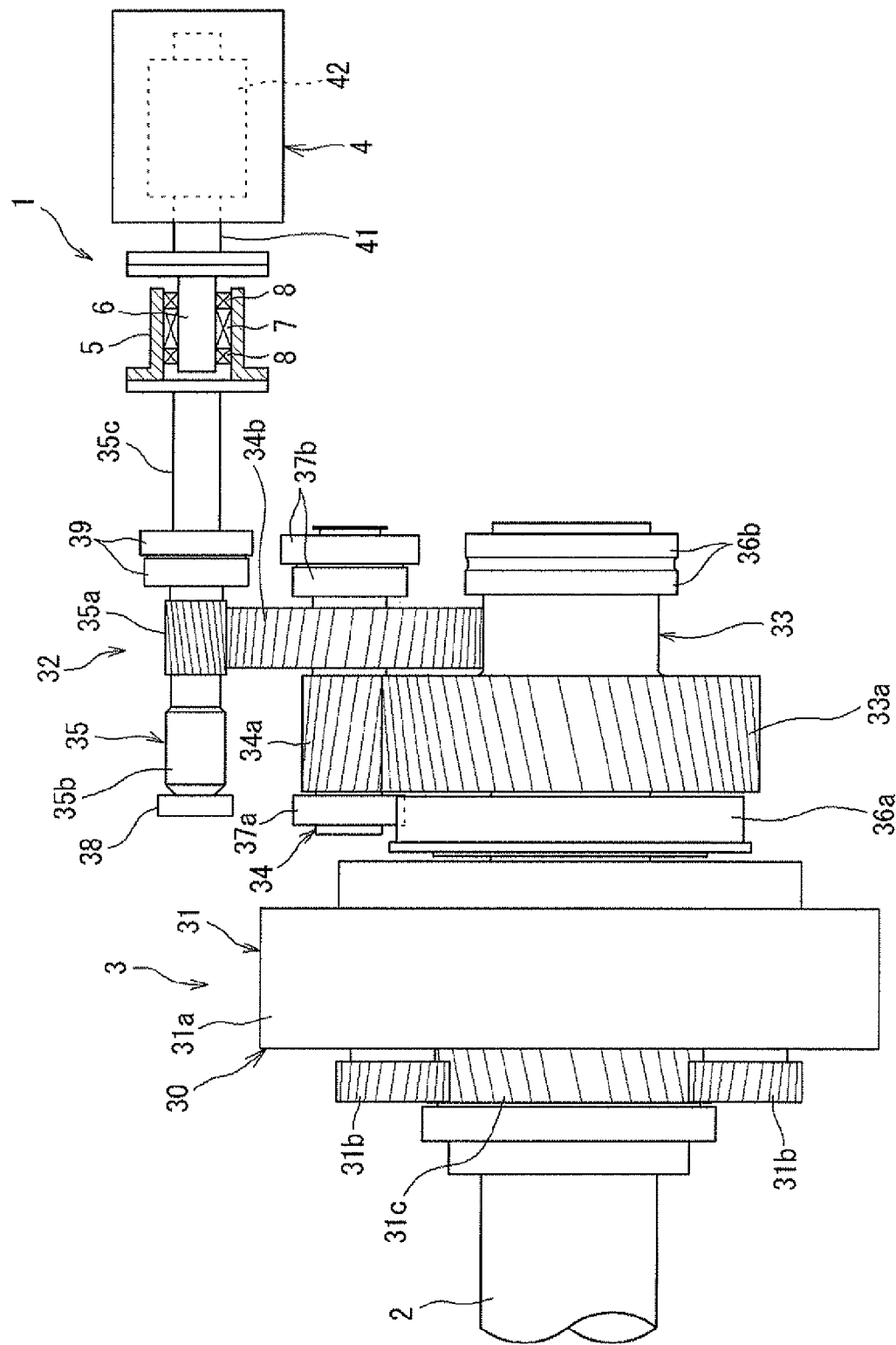
- FIG. 1 is a schematic side view that shows a wind power generator according to an embodiment of the invention.

Hereinafter, embodiments of the invention will be described with reference to the accompanying drawings. FIG. 1 is a schematic side view that shows a wind power generator 1 according to an embodiment of the invention. The wind power generator (power generating apparatus) 1 includes a main shaft 2, a speed increaser 3 and a generator 4 coupled to the speed increaser 3. The main shaft 2 rotates upon reception of wind force (external force). The speed increaser 3 is coupled to the main shaft 2. The generator 4 is coupled to the speed increaser 3. The generator 4 is driven while the speed of rotation transmitted from the main shaft 2 is increased by the speed increaser 3.

For example, blades (not shown) are coupled to the distal end portion of the main shaft 2 so as to be rotatable together with the main shaft 2. When the blades receive wind force, the blades rotate together with the main shaft 2. The generator 4 includes, for example, a drive shaft 41, a rotor 42 and a stator (not shown). The drive shaft 41 rotates upon reception of the rotation of which the speed has been increased by the speed increaser 3. The rotor 42 is incorporated in the generator 4. The rotor 42 is coupled to the drive shaft 41 so as to be rotatable together with the drive shaft 41, and electric power is generated as the rotor 42 is driven due to the rotation of the drive shaft 41.

The speed increaser 3 includes a gear mechanism (rotation transmission mechanism) 30 that receives the rotation of the main shaft 2 and increases the speed of the rotation. The gear mechanism 30 includes a planetary gear mechanism 31 and a high-speed gear mechanism 32. The high-speed gear mechanism 32 receives the rotation of which the speed has been increased by the planetary gear mechanism 31, and further increases the speed of the rotation. The planetary gear mechanism 31 includes an internal gear (ring gear) 31a, a plurality of planetary gears 31b, and a sun gear 31c. The planetary gears 31b are held by a planetary carrier (not shown) that is coupled to the main shaft 2 so as to be rotatable together with the main shaft 2. The sun gear 31c is in mesh with the planetary gears 31b. Thus, when the planetary carrier rotates together with the main shaft 2, the sun gear 31c is rotated via the planetary gears 31b, and the rotation is transmitted to a low-speed shaft 33 of the high-speed gear mechanism 32.

The high-speed gear mechanism 32 includes the low-speed shaft 33, an intermediate shaft 34 and an output shaft 35. The low-speed shaft 33 has a low-speed gear 33a. The intermediate shaft 34 has a first intermediate gear 34a and a second intermediate gear 34b. The output shaft 35 has a high-speed gear 35a. The low-speed shaft 33 is formed of a large-sized rotary shaft of which the diameter is, for example, about 1 m, and is arranged concentrically with the main shaft 2. Respective axial end portions of the low-speed shaft 33 are rotatably supported by roller bearings 36a, 36b. The intermediate shaft 34 is arranged above the low-speed shaft 33. Respective axial end portions of the intermediate shaft 34 are rotatably supported by roller bearings 37a, 37b. The first intermediate gear 34a of the intermediate shaft 34 is in mesh with the low-speed gear 33a. The second intermediate gear 34b is in mesh with the high-speed gear 35a. The output shaft 35 is arranged above the intermediate shaft 34, and outputs rotary torque. One axial end portion 35b and the other axial end portion (output end portion) 35c of the output shaft 35 are rotatably supported by roller bearings 38, 39, respectively.

With the above configuration, the speed of rotation of the main shaft 2 is increased in three stages at the gear ratio of the planetary gear mechanism 31, the gear ratio between the low-speed gear 33a and the first intermediate gear 34a and the gear ratio between the second intermediate gear 34b and the high-speed gear 35a, and rotary torque is output from the output end portion 35c of the output shaft 35. That is, the speed of rotation of the main shaft 2 caused due to wind force is increased by the speed increaser 3 in three stages, and the rotation with an increased speed drives the generator 4.

Figure 2:
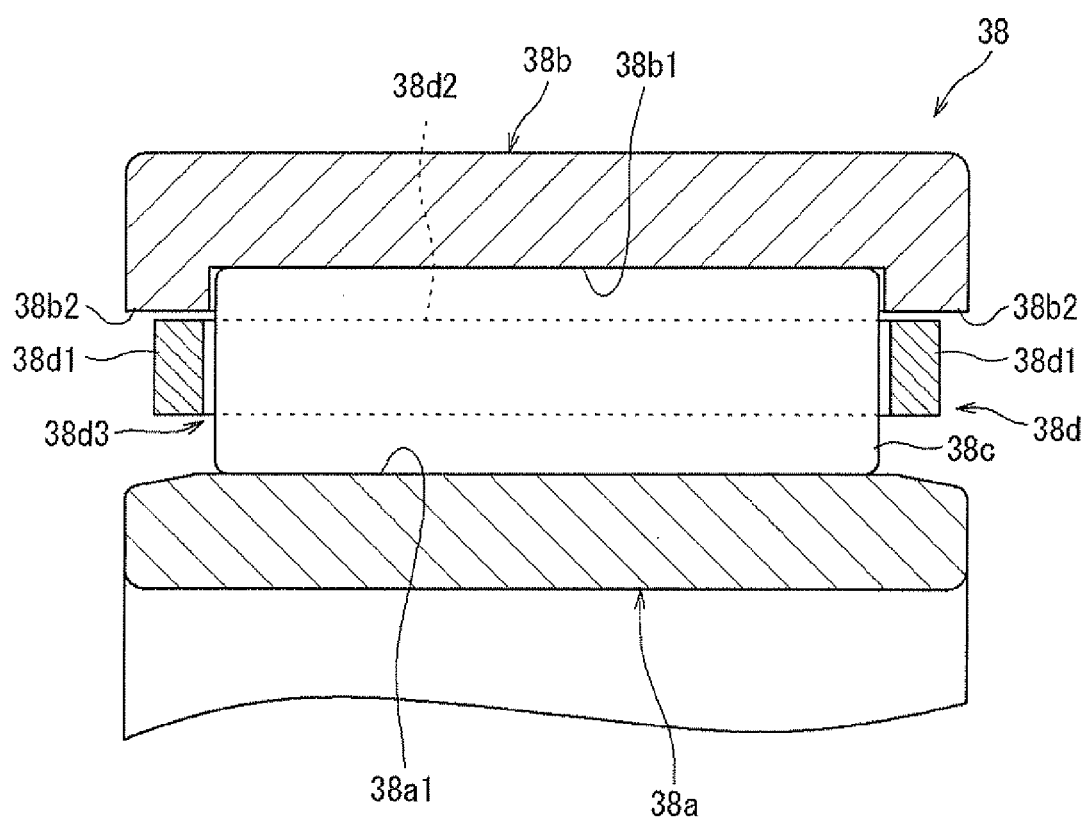
FIG. 2 is a sectional view that shows a roller bearing of a speed increaser in the wind power generator.

FIG. 2 is a sectional view that shows the roller bearing that supports the one end portion 35b of the output shaft 35. As shown in FIG. 2, the roller bearing 38 is formed of a cylindrical roller bearing. The roller bearing 38 includes an inner ring 38a, an outer ring 38b, a plurality of cylindrical rollers 38c and an annular cage 38d. The inner ring 38a is fixedly fitted to the outer periphery of the output shaft 35. The outer ring 38b is fixed to a housing (not shown). The cylindrical rollers 38c are rollably arranged between the inner ring 38a and the outer ring 38b. The cage 38d holds the cylindrical rollers 38c arranged at predetermined intervals in the circumferential direction. The inner ring 38a, the outer ring 38b and the cylindrical rollers 38c are made of, for example, bearing steel. The cage 38d is made of, for example, a copper alloy.

The inner ring 38a has an inner ring raceway surface 38a1 formed at the axial center portion of the outer periphery of the inner ring 38a. The outer ring 38b is arranged concentrically with the inner ring 38a. The outer ring 38b has an outer ring raceway surface 38b1 and a pair of outer ring rib portions 38b2. The outer ring raceway surface 38b1 is formed at the axial center portion of the inner periphery of the outer ring 38b. The outer ring rib portions 38b2 are formed on respective axial sides of the outer ring raceway surface 38b1. The outer ring raceway surface 38b1 is arranged so as to face the inner ring raceway surface 38a1. The outer ring rib portions 38b2 are respectively formed so as to protrude radially inward from respective axial end portions of the inner periphery of the outer ring 38b. The end faces of the cylindrical rollers 38c are in sliding contact with the outer ring rib portions 38b2.

The cylindrical rollers 38c are rollably arranged between the inner ring raceway surface 38a1 of the inner ring 38a and the outer ring raceway surface 38b1 of the outer ring 38b. The cage 38d has a pair of annular portions 38d1 and a plurality of cage bar portions 38d2. The annular portions 38d1 are arranged so as to be spaced apart from each other in the axial direction. The cage bar portions 38d2 are arranged at equal intervals along the circumferential direction of the annular portions 38d1, and couple the annular portions 38d1 to each other. A pocket 38d3 is defined by the annular portions 38d1 and any adjacent two of the cage bar portions 38d2. Each cylindrical roller 38c is arranged in a corresponding one of the pockets 38d3.

As shown in FIG. 1, the wind power generator 1 further includes an input rotor 5, an output rotor 6, a one-way clutch 7 and a pair of rolling bearings 8. The input rotor 5 is provided so as to be rotatable together with the output shaft 35 of the speed increaser 3. The output rotor 6 is provided so as to be rotatable together with the drive shaft 41 of the generator 4. The one-way clutch 7 is arranged between the input rotor 5 and the output rotor 6. The rolling bearings 8 are arranged on respective axial sides of the one-way clutch 7. The one-way clutch 7 and the rolling bearings 8 transmit rotation of the output shaft 35 to the drive shaft 41 via the input rotor 5 and the output rotor 6. In the wind power generator 1 according to the present embodiment, the rolling bearings 8 are arranged on respective axial sides of the one-way clutch 7. Alternatively, the rolling bearing 8 may be arranged only on one axial side of the one-way clutch 7.

Figure 3:
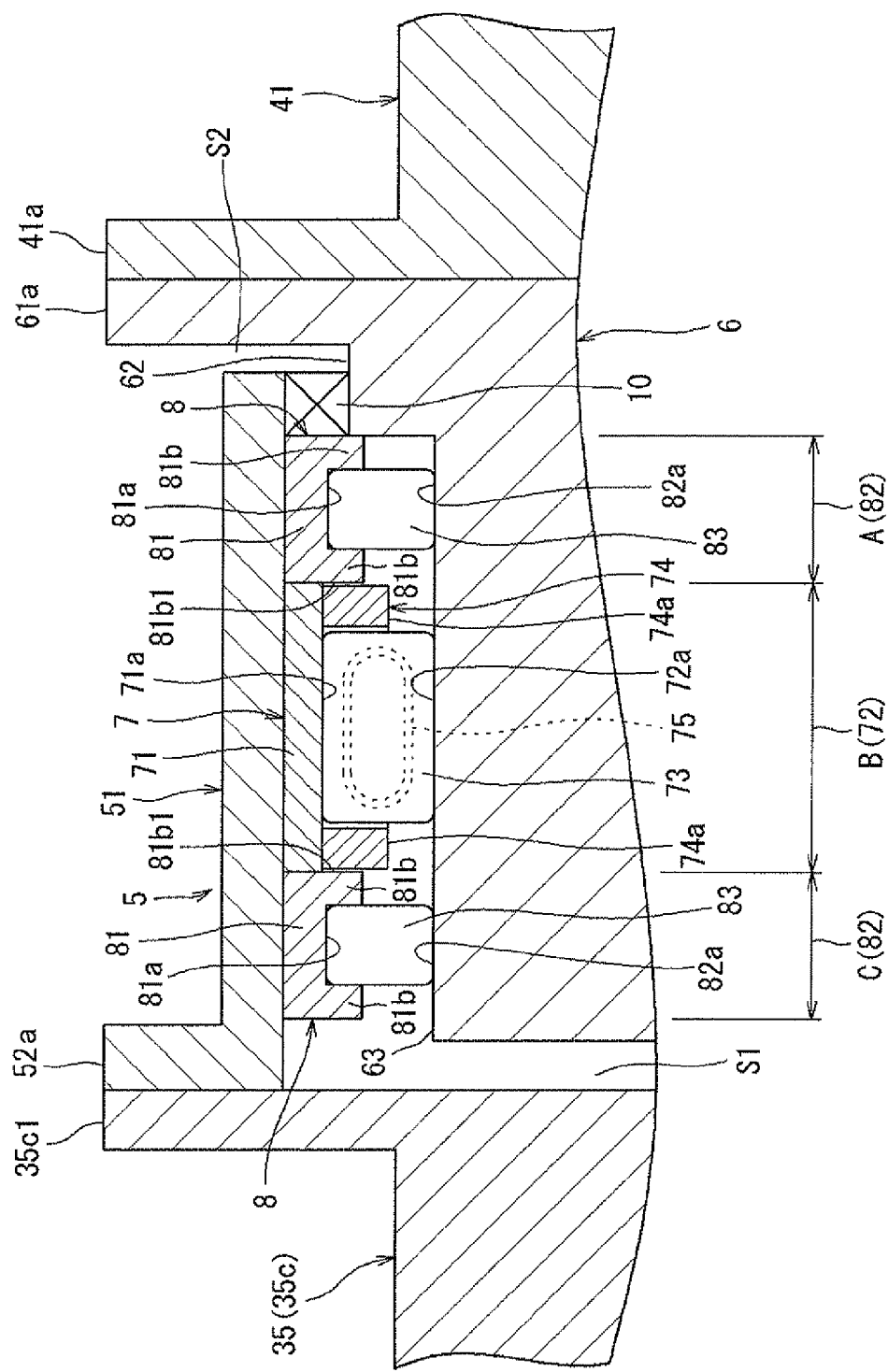
FIG. 3 is a sectional view that shows a coupling portion between an output shaft of the speed increaser and a drive shaft of a generator in the wind power generator.

FIG. 3 is a sectional view that shows the coupling portion between the output shaft 35 of the speed increaser 3 and the drive shaft 41 of the generator 4. As shown in FIG. 3, the input rotor 5 is arranged concentrically with the output shaft 35, and has a cylindrical portion 51 and a flange portion 52a formed at the other axial end portion (left end portion in FIG. 3) of the cylindrical portion 51. The flange portion 52a is formed so as to extend radially outward beyond the outer periphery of the cylindrical portion 51, and is detachably fixed to the output end portion 35c of the output shaft 35. Specifically, the flange portion 52a is fixedly fastened to a flange portion 35c1 with bolts and nuts (not shown) in a state where the flange portion 52a is in contact with the flange portion 35c1 formed at the output end portion 35c of the output shaft 35. The inner periphery of the cylindrical portion 51 is a cylindrical surface.

The output rotor 6 is arranged concentrically with and radially inward of the input rotor 5. The output rotor 6 has a flange portion 61a, a large-diameter portion 62 and a small-diameter portion 63 arranged in this order from its one axial end portion (right end portion in FIG. 3) toward the other axial end portion (left end portion in FIG. 3). The flange portion 61a is formed so as to extend radially outward beyond the outer periphery of the large-diameter portion 62, and is detachably fixed to the drive shaft 41. Specifically, the flange portion 61a is fixedly fastened to a flange portion 41a formed on the drive shaft 41 with bolts and nuts (not shown) in a state where the flange portion 61a is in contact with the flange portion 41a. A clearance S1 is formed between the end face of the small-diameter portion 63 and the end face of the flange portion 35c1 of the output shaft 35.

An annular seal member 10 is provided in a clearance between the inner periphery of the one axial end portion (right end portion in FIG. 3) of the cylindrical portion 51 of the input rotor 5 and the outer periphery of the large-diameter portion 62 of the output rotor 6. The seal member 10 is used to hermetically seal an annular space between the cylindrical portion 51 and the large-diameter portion 62. A clearance S2 is formed between the one end portion-side end face of the cylindrical portion 51 of the input rotor 5 and the end face of the flange portion 61a of the output rotor 6, the end face facing the one end portion-side end face of the cylindrical portion 51. The clearance S2 and the clearance S1 allow the output rotor 6 to move in the axial direction with respect to the input rotor 5 in a state where the output rotor 6 is separated from the drive shaft 41.

Figure 4:
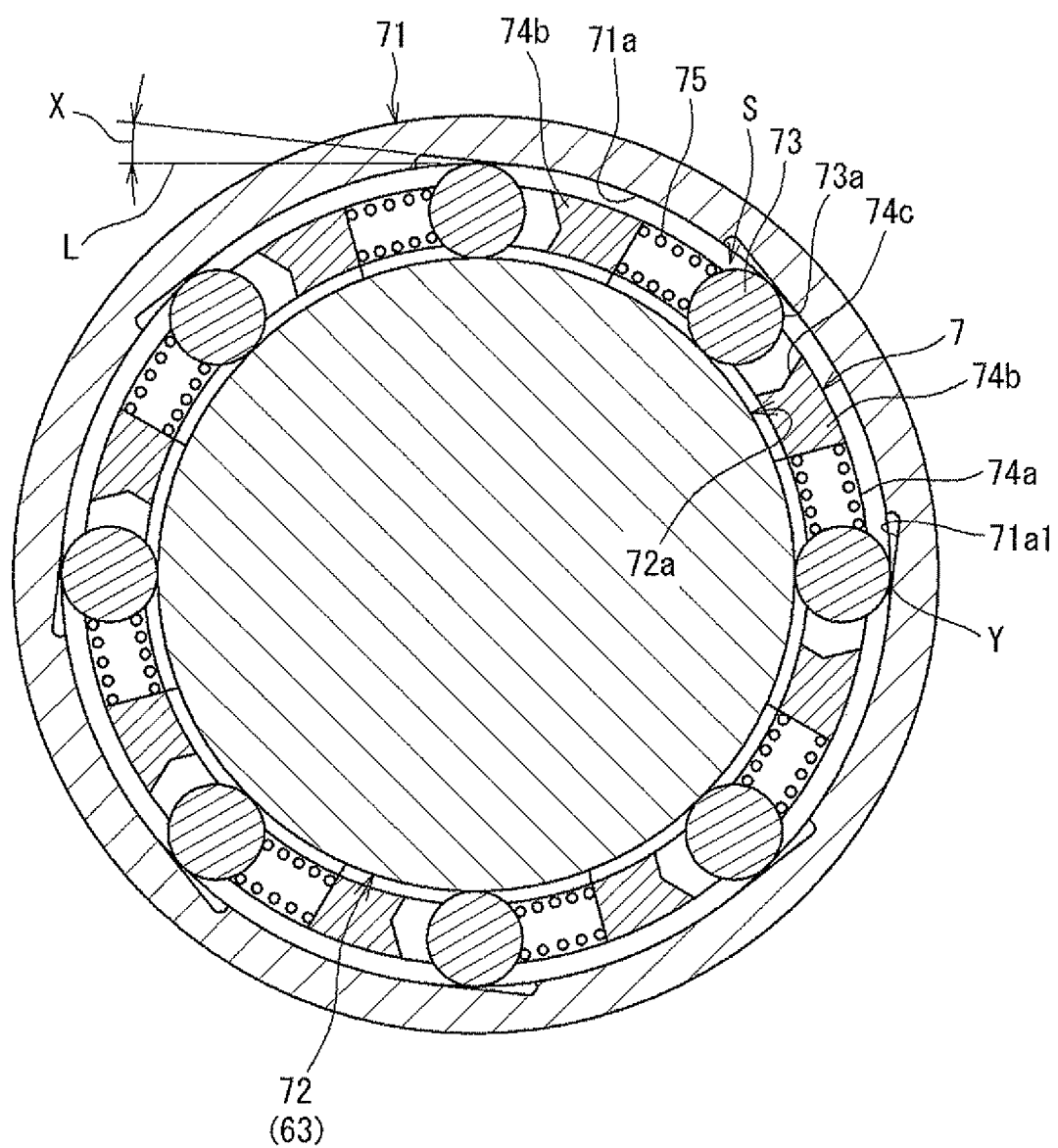
FIG. 4 is a sectional view that shows a one-way clutch in the wind power generator.

FIG. 4 is a sectional view that shows the one-way clutch 7. As shown in FIG. 3 and FIG. 4, the one-way clutch 7 includes an outer ring 71, an inner ring 72 and a plurality of rollers 73. The rollers 73 are arranged between an inner periphery 71a of the outer ring 71 and an outer periphery 72a of the inner ring 72. The outer ring 71 is fixedly fitted to the inner periphery of the axial center portion of the cylindrical portion 51 of the input rotor 5, and rotates together with the input rotor 5. A region B of the axial center portion of the small-diameter portion 63 of the output rotor 6 is used as the inner ring 72 of the one-way clutch 7. The rollers 73 have a columnar shape, and the number of the rollers 73 arranged in the circumferential direction is eight in the present embodiment.

The one-way clutch 7 further includes an annular cage 74 and a plurality of elastic members (springs) 75. The cage 74 retains the rollers 73 arranged at predetermined intervals in the circumferential direction. The elastic members 75 elastically urge the rollers 73 in one direction. The cage 74 has a pair of annular portions 74a and a plurality of cage bar portions 74b. The annular portions 74a face each other in the axial direction. The cage bar portions 74b extend in the axial direction between the annular portions 74a. The cage bar portions 74b are arranged at equal intervals in the circumferential direction, and couple the annular portions 74a to each other. A plurality of pockets 74c each are defined by the annular portions 74a and any adjacent two cage bar portions 74b, and each roller 73 is individually accommodated in a corresponding one of the pockets 74c. Each elastic member 75 is formed of a compression coil spring. Each elastic member 75 is individually accommodated in the corresponding pocket 74c of the cage 74, and is connected to the corresponding cage bar portion 74b.

As shown in FIG. 4, flat outer ring cam surfaces 71a, of which the number (eight) is equal to the number of the rollers 73, are formed in the inner periphery 71a of the outer ring 71. Each outer ring cam surface 71a is inclined radially outward at a predetermined angle X (for example, 7 to 10°) with respect to a tangent L to the inner periphery 71a of the outer ring 71. Each outer ring cam surface 71a1 extends a predetermined length toward both sides in the circumferential direction with respect to a portion Y that the corresponding roller 73 contacts in a state where the roller 73 is moved in a clockwise direction (state shown in FIG. 4). As described above, a plurality of (eight) wedge-shaped spaces S are formed between the outer ring cam surfaces 71a and the inner ring outer periphery 72a so as to be arranged in the circumferential direction.

Each roller 73 is individually arranged in a corresponding one of the wedge-shaped spaces S. Each elastic member 75 urges the corresponding roller 73 in a direction in which the corresponding wedge-shaped space S becomes narrower. The outer periphery of each roller 73 serves as a contact surface 73a that contacts the corresponding outer ring cam surface 71a and the inner ring outer periphery 72a. The contact surface 73a is formed so as to extend straight in the width direction (axial direction). In the one-way clutch 7, grease that is lubricant is provided between the inner ring 72 and the outer ring 71. The lubricant is formed of ester as a base oil and urea-based material as a thickener, and is resistant to influence of a temperature change.

In the thus configured one-way clutch 7, when the input rotor 5 rotates at an increased speed and, as a result, the rotation speed of the input rotor 5 becomes higher than the rotation speed of the output rotor 6, the outer ring 71 attempts to rotate in one direction (counterclockwise direction in FIG.

4) with respect to the inner ring 72. In this case, due to the urging force of the elastic members 75, the rollers 73 slightly move in a direction in which the wedge-shaped spaces S become narrower. Thus, the contact surfaces 73a of the rollers 73 are pressed against the outer ring cam surfaces 71a and the inner ring outer periphery 72a. As a result, the one-way clutch 7 is placed in a state where the rollers 73 are engaged with the inner ring 72 and the outer ring 71. Thus, the inner ring 72 and the outer ring 71 are rotatable together with each other in the one direction. Therefore, it is possible to connect the input rotor 5 and the output rotor 6 to each other such that the input rotor 5 and the output rotor 6 are rotatable together with each other.

When the input rotor 5 rotates at a constant speed after rotating at an increased speed and, as a result, the rotation speed of the input rotor 5 becomes equal to the rotation speed of the output rotor 6, the rollers 73 are retained in a state where the rollers 73 are engaged with the inner ring 72 and the outer ring 71. Therefore, the one-way clutch 7 keeps the inner ring 72 and the outer ring 71 rotating in the one direction together with each other, and the input rotor 5 and the output rotor 6 continue rotating together with each other.

On the other hand, when the input rotor 5 rotates at a reduced speed and, as a result, the rotation speed of the input rotor 5 becomes lower than the rotation speed of the output rotor 6, the outer ring 71 attempts to rotate in the other direction (clockwise direction in FIG. 4) with respect to the inner ring 72. In this case, the rollers 73 slightly move against the urging force of the elastic members 75 in a direction in which the wedge-shaped spaces S become wider. Thus, the rollers 73 and the inner and outer rings 71, 72 are disengaged from each other. When the rollers 73 are disengaged from the inner and outer rings 71, 72 as described above, the input rotor 5 and the output rotor 6 are disconnected from each other.

In the above-described one-way clutch 7, the urging force of the elastic members 75 is set to such a value that when the rotation speed of the output shaft 35 exceeds a predetermined rotation speed in a state where the rollers 73 are engaged with the inner ring 72 and the outer ring 71, each roller 73 is allowed to move away from the inner ring outer periphery 72a along the corresponding outer ring cam surface 71a due to strong centrifugal force that acts on each roller 73. Thus, the elastic members 75 provide a rotation speed limiter function to the one-way clutch 7 in cooperation with the outer ring cam surfaces 71a. The "predetermined rotation speed" is a limit value at which it is possible to safely rotate the drive shaft 41 of the generator 4, and is set to, for example, a value within the range of 2500 to 4000 rpm.

Thus, when the rotation speed of the output shaft 35 exceeds the predetermined rotation speed in a state where the rollers 73 of the one-way clutch 7 are engaged with the inner ring 72 and the outer ring 71 and the generator 4 is driven, the rollers 73 move along the corresponding outer ring cam surfaces 71a due to centrifugal force that acts on the rollers 73 against the urging force of the elastic members 75, and the rollers 73 and the inner and outer rings 72, 71 are disengaged from each other. Thus, even when a blade adjustment mechanism for preventing the rotation speed of the main shaft 2 from reaching and exceeding a predetermined rotation speed due to strong wind does not operate for some reasons, it is possible to prevent the drive shaft 41 of the generator 4 from rotating at a high speed that exceeds an allowable rotation speed.

As shown in FIG. 3, the rolling bearings 8 are arranged between the cylindrical portion 51 of the input rotor 5 and the small-diameter portion 63 of the output rotor 6. The rolling bearings 8 support the input rotor 5 and the output rotor 6 such that the input rotor 5 and the output rotor 6 are rotatable relative to each other. The rolling bearings 8 are respectively arranged next to respective axial sides of the one-way clutch 7 such that the axial end portions of the rolling bearings 8 are allowed to contact respective axial end faces of the cage 74 of the one-way clutch 7.

Each rolling bearing 8 is formed of a cylindrical roller bearing that includes an outer ring 81, an inner ring 82 and a plurality of cylindrical rollers 83. The cylindrical rollers 83 are rollably arranged between the outer ring 81 and the inner ring 82. The outer ring 81 has an outer ring raceway surface 81a and outer ring rib portions 81b. The outer ring raceway surface 81a is formed on the inner periphery of the outer ring 81. The outer ring rib portions 81b are formed so as to protrude radially inward from respective axial sides of the outer ring raceway surface 81a. End faces of each cylindrical roller 83 are in sliding contact with the inner side faces of the respective outer ring rib portions 81b. Outer side faces 81b1 of the respective outer ring rib portions 81b, which are located next to the one-way clutch 7, serve as contact surfaces that the outer side faces of the annular portions 74a contact. The outer side faces of the annular portions 74a are the axial end faces of the cage 74 of the one-way clutch 7.

A region A and a region C at respective axial end portions of the small-diameter portion 63 of the output rotor 6 serve as the inner rings 82 of the rolling bearings 8. The outer peripheries of the region A and region C serve as inner ring raceway surfaces 82a of the inner rings 82. The cylindrical rollers 83 are rollably arranged between each inner ring raceway surface 82a and the corresponding outer ring raceway surface 81a.

With the thus configured wind power generator 1, by the one-way clutch 7 arranged between the input rotor 5 that rotates together with the output shaft 35 of the speed increaser 3 and the output rotor 6 that rotates together with the drive shaft 41 of the generator 4, when the rotation speed of the input rotor 5 becomes higher than the rotation speed of the output rotor 6, it is possible to connect the input rotor 5 and the output rotor 6 to each other such that the input rotor 5 and the output rotor 6 are rotatable together with each other; whereas, when the rotation speed of the input rotor 5 becomes lower than the rotation speed of the output rotor 6, it is possible to disconnect the input rotor 5 and the output rotor 6 from each other. That is, even when the rotation speed of the output shaft 35 is steeply decreased via the main shaft 2 due to a reduction in wind force, it is possible to prevent rotation due to the inertia of the rotor 42 of the generator 4 from being transmitted to the output shaft 35 via the drive shaft 41. Thus, it is possible to suppress a reduction in radial load that acts on the roller bearing 38 that supports the output shaft 35 and to suppress a delay in rotation of each cylindrical roller 38c accordingly. Therefore, when high load acts on the cylindrical rollers 38c through a steep increase in the rotation speed of the main shaft 2 due to a change in wind force from the above-described state, the cylindrical rollers 38c are less likely to slip at the contact surfaces with the inner ring 38a. Therefore, it is possible to effectively suppress occurrence of smearing in the roller bearing 38. When the rotation speed of the output shaft 35 exceeds a predetermined value in a state where the input rotor 5 and the output rotor 6 are connected to each other, it is possible to disconnect the input rotor 5 and the output rotor 6 from each other. Therefore, it is possible to prevent abnormal rotation of the drive shaft 41 of the generator 4.

By preventing rotation of the rotor 42 due to inertia from being transmitted to the output shaft 35, it is possible to reduce the load that acts on the roller bearings 36a, 36b, 37a, 37b, 38, 39, and the like, of the speed increaser 3. Thus, it is possible to reduce the sizes of all the gears 31b, 31c of the planetary gear mechanism 31, the shafts 33 to 35 of the high-speed gear mechanism 32 and the roller bearings 36a, 36b, 37a, 37b, 38, 39. Therefore, it is possible to reduce the weight of the speed increaser 3 and to manufacture the speed increaser 3 at low cost. Furthermore, by disconnecting the input rotor 5 and the output rotor 6 from each other, the rotor 42 of the generator 4 continues rotation due to inertia without a steep reduction in rotation speed. Therefore, it is possible to increase the average rotation speed of the rotor 42. Thus, it is possible to improve the power generation efficiency of the generator 4.

In the present embodiment, it is possible to adjust the urging force of each elastic member 75, and to form each outer ring cam surface 71a into such a shape that the corresponding roller 73 is allowed to move away from the inner ring outer periphery 72a due to centrifugal force. Thus, the function of a rotation speed limiter is provided to the one-way clutch 7. Therefore, it is possible to easily constitute the rotation speed limiter without increasing the number of components.

The rolling bearings 8 are arranged between the input rotor 5 and the output rotor 6, and support the input rotor 5 and the output rotor 6 such that the input rotor 5 and the output rotor 6 are rotatable relative to each other. Thus, when the rollers 73 are disengaged from the inner ring 72 and the outer ring 71 in the one-way clutch 7 and, as a result, clearances are formed at the wedge-shaped spaces S between the rollers 73 and the inner and outer rings 72, 71, relative movement between the input rotor 5 and the output rotor 6 in the radial direction is prevented by the rolling bearings 8. Therefore, it is possible to prevent backlash of the input rotor 5 and the output rotor 6 in the radial direction during operation of the wind power generator 1.

The rolling bearings 8 are arranged next to and on respective axial sides of the one-way clutch 7 such that the respective axial end faces of the cage 74 of the one-way clutch 7 are allowed to contact the axial end portions of the rolling bearings 8. Thus, respective axial end faces of the cage 74 are brought into contact with the axial end portions of the rolling bearings 8. As a result, it is possible to prevent the cage 74 from moving toward both sides in the axial direction. The axial end faces (the outer side faces of the annular portions 74a) of the cage 74 of the one-way clutch 7 are respectively brought into contact with the outer ring rib portions 81b of the rolling bearings 8. Therefore, it is possible to use the outer ring rib portions 81b of the rolling bearings 8 as members that restrict axial movement of the cage 74. Thus, it is possible to simplify the structure of each rolling bearing 8.

The inner ring outer periphery 72a of the one-way clutch 7 and the inner ring raceway surfaces 82a of the rolling bearings 8 are formed on the outer periphery of the output rotor 6. Thus, it is possible to use the output rotor 6 as the inner ring 72 of the one-way clutch 7 and the inner rings 82 of the rolling bearings 8. Thus, it is possible to simplify the structure of the wind power generator 1 as a whole. The output rotor 6 is detachably fixed to the drive shaft 41 of the generator 4, and is arranged so as to be movable in the axial direction with respect to the input rotor 5. Therefore, when the output rotor 6 is removed from the drive shaft 41 and is moved in the axial direction with respect to the input rotor 5, it is possible to remove the output rotor 6 from the input rotor 5. Thus, it is possible to remove the inner ring 72 of the one-way clutch 7 and the inner rings 82 of the rolling bearings 8 at the same time. Therefore, it is possible to easily conduct maintenance work for the one-way clutch 7 and the rolling bearings 8. At this time, because it is not necessary to move the generator 4, it is possible to further easily conduct the maintenance work.

Figure 5:
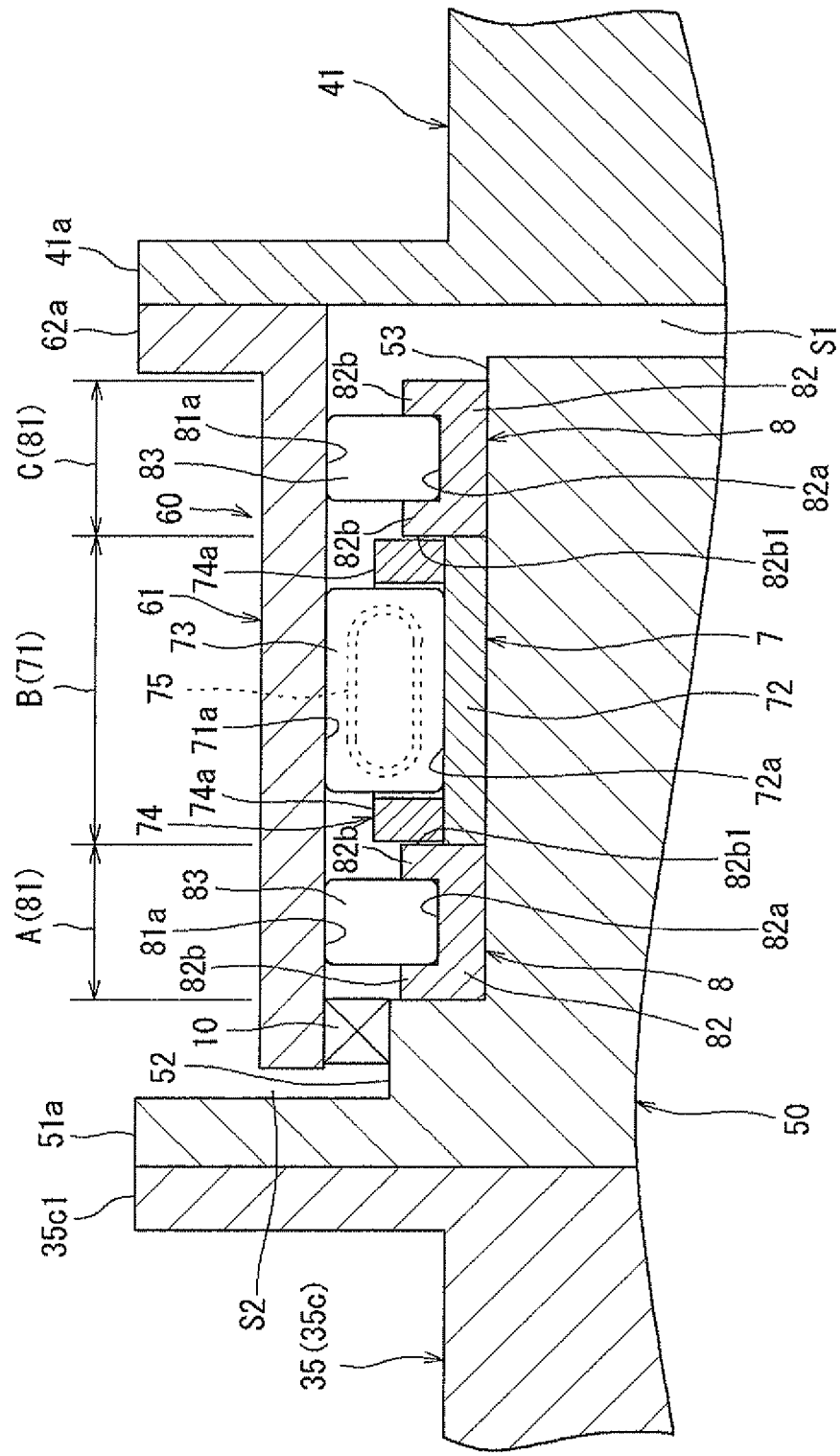
FIG. 5 is a sectional view that shows another embodiment of a coupling portion between the output shaft of the speed increaser and the drive shaft of the generator in the wind power generator.
Figure 6:
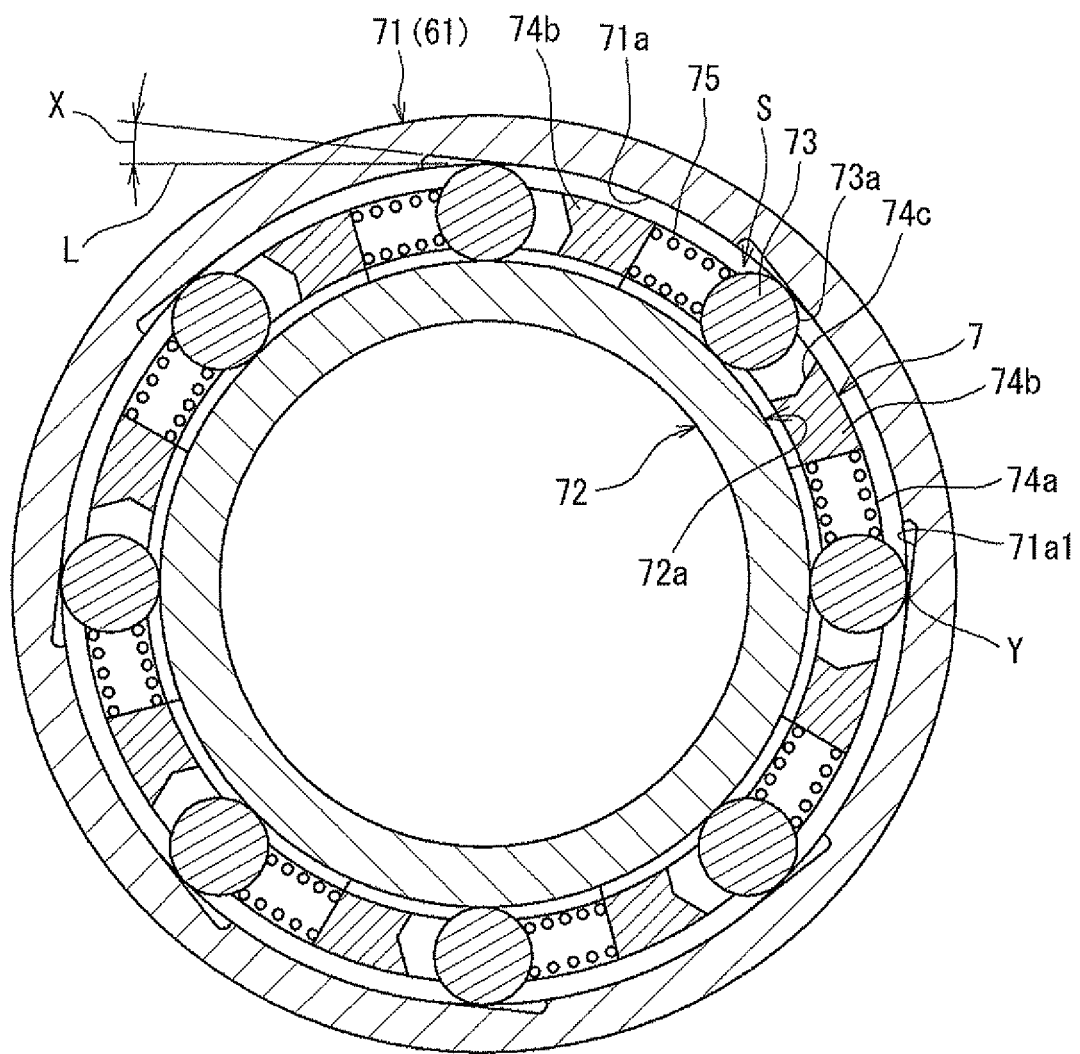
FIG. 6 is a sectional view that shows a one-way clutch according to the embodiment shown in FIG. 5.

FIG. 5 is a sectional view that shows another embodiment of a coupling portion between the output shaft of the speed increaser and the drive shaft of the generator. FIG. 6 is a sectional view that shows a one-way clutch in the embodiment shown in FIG. 5. The present embodiment mainly differs from the embodiment shown in FIG. 3 and FIG. 4 in that an output rotor 60 is arranged radially outward of an input rotor 50, and the same portions as those in the embodiment shown in FIG. 3 are denoted by the same reference numerals as those in the embodiment shown in FIG. 3.

The input rotor 50 having the same shape as that of the output rotor 6 in the embodiment shown in FIG. 3 is arranged in a laterally symmetrical orientation in FIG. 5 with respect to the output rotor 6 in the embodiment shown in FIG. 3, and a flange portion 51a at the one axial end portion (left end portion in FIG. 5) of the input rotor 50 is detachably fixed to the flange portion 35c1 of the output shaft 35. The output rotor 60 having the same shape as the input rotor 5 in the embodiment shown in FIG. 3 is arranged in a laterally symmetrical orientation in FIG. 5 with respect to the input rotor 5 in the embodiment shown in FIG. 3, and a flange portion 62a is detachably fixed to the flange portion 41a of the drive shaft 41.

As shown in FIG. 5, inner rings 82 of the rolling bearings 8 are formed of members formed separately from a small-diameter portion 53 of the input rotor 50, Each inner ring 82 has an inner ring raceway surface 82a and inner ring rib portions 82b. The inner ring raceway surface 82a is formed on the outer periphery of the inner ring 82. The inner ring rib portions 82b are formed so as to protrude radially outward from respective axial sides of the inner ring raceway surface 82a. The inner rings 82 are fitted to the outer periphery of the small-diameter portion 53 of the input rotor 50 so as to be rotatable together with the input rotor 50. End faces of each cylindrical roller 83 are in sliding contact with the inner side faces of the respective inner ring rib portions 82b. Outer side faces 82b1 of the inner ring rib portions 82b located next to the one-way clutch 7 serve as contact surfaces that the outer side faces of the annular portions 74a contact. The outer side faces of the annular portions 74a are the axial end faces of the cage 74 of the one-way clutch 7.

A region A and a region C at respective axial end portions of a cylindrical portion 61 of the output rotor 60 serve as outer rings 81 of the rolling bearings 8. The inner peripheries of the region A and region C serve as the outer ring raceway surfaces 81a of the outer rings 81. The cylindrical rollers 83 are rollably arranged between each outer ring raceway surface 81a and the corresponding inner ring raceway surface 82a.

FIG. 6 is a sectional view that shows the one-way clutch 7. The basic configuration of the one-way clutch 7 is similar to that of the one-way clutch 7 shown in FIG. 4. That is, the one-way clutch 7 includes the inner ring 72, the outer ring 71 and the rollers 73. The rollers 73 are arranged between the outer periphery 72a of the inner ring 72 and the inner periphery 71a of the outer ring 71. The inner ring 72 is fixedly fitted to the outer periphery of the axial center portion of the small-diameter portion 53 of the input rotor 50, and rotates together with the small-diameter portion 53. A region B at the axial center portion of the cylindrical portion 61 of the output rotor 60 serves as the outer ring 71 of the one-way clutch 7. Thus, the inner periphery 71a is formed on the inner periphery of the region B of the cylindrical portion 71. An annular space between a large-diameter portion 52 of the input rotor 50 and the inner periphery of the left end portion of the output rotor 60 is hermetically sealed by the seal member 10.

With the thus configured one-way clutch 7 as well, similar operation and advantageous effects to those of the one-way clutch 7 shown in FIG. 3 are obtained. Particularly, in the present embodiment, the outer ring inner periphery 71a of the one-way clutch 7 and the outer ring raceway surfaces 81a of the rolling bearings 8 are formed on the inner periphery of the cylindrical portion 61 of the output rotor 60. Thus, it is possible to use the output rotor 60 as the outer ring 71 of the one-way clutch 7 and the outer rings 81 of the rolling bearings 8. Thus, it is possible to simplify the structure of the wind power generator 1 as a whole.

Figure 7:
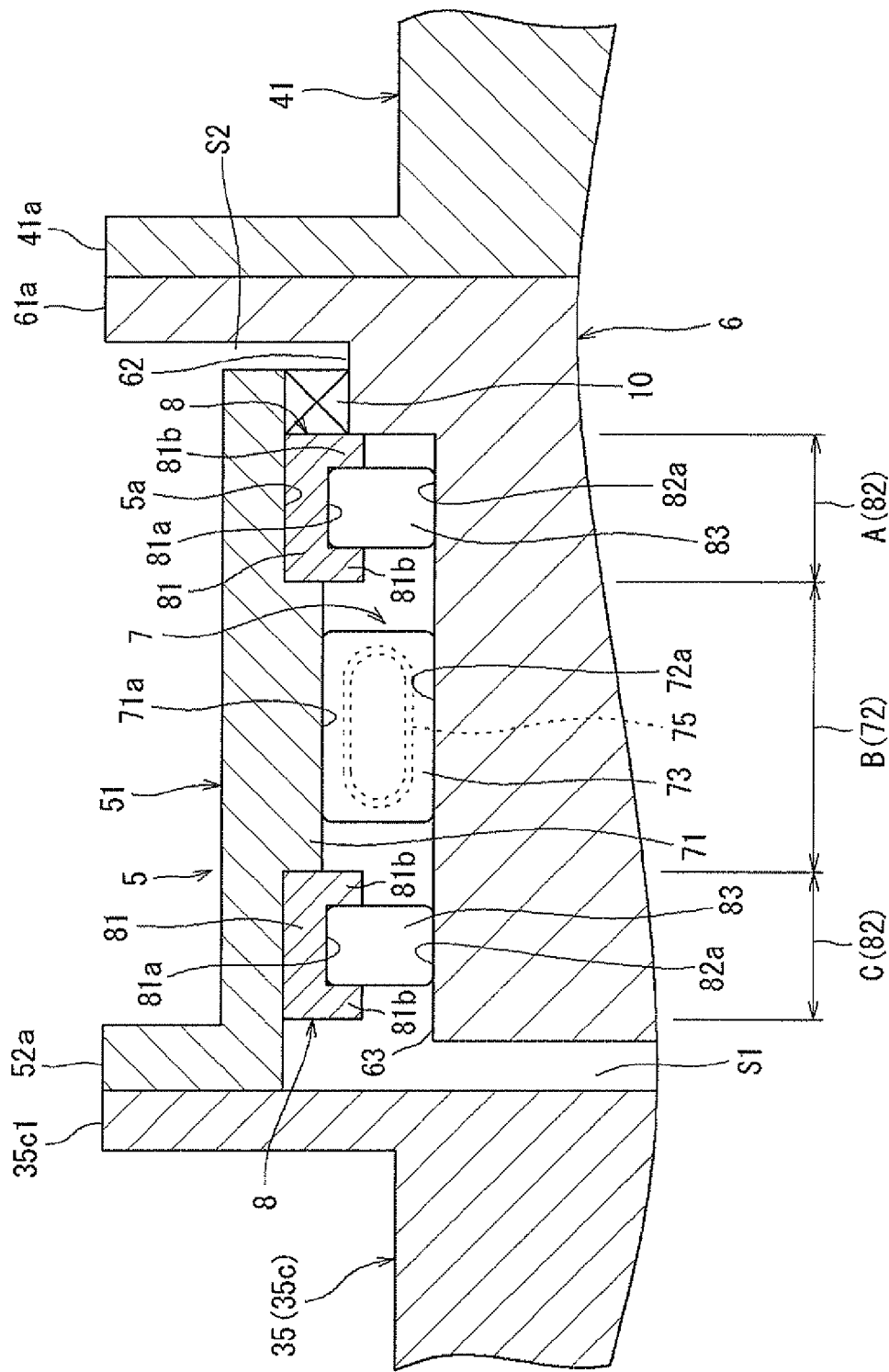
FIG. 7 is a sectional view that shows further another embodiment of a coupling portion between the output shaft of the speed increaser and the drive shaft of the generator in the wind power generator.
Figure 8:
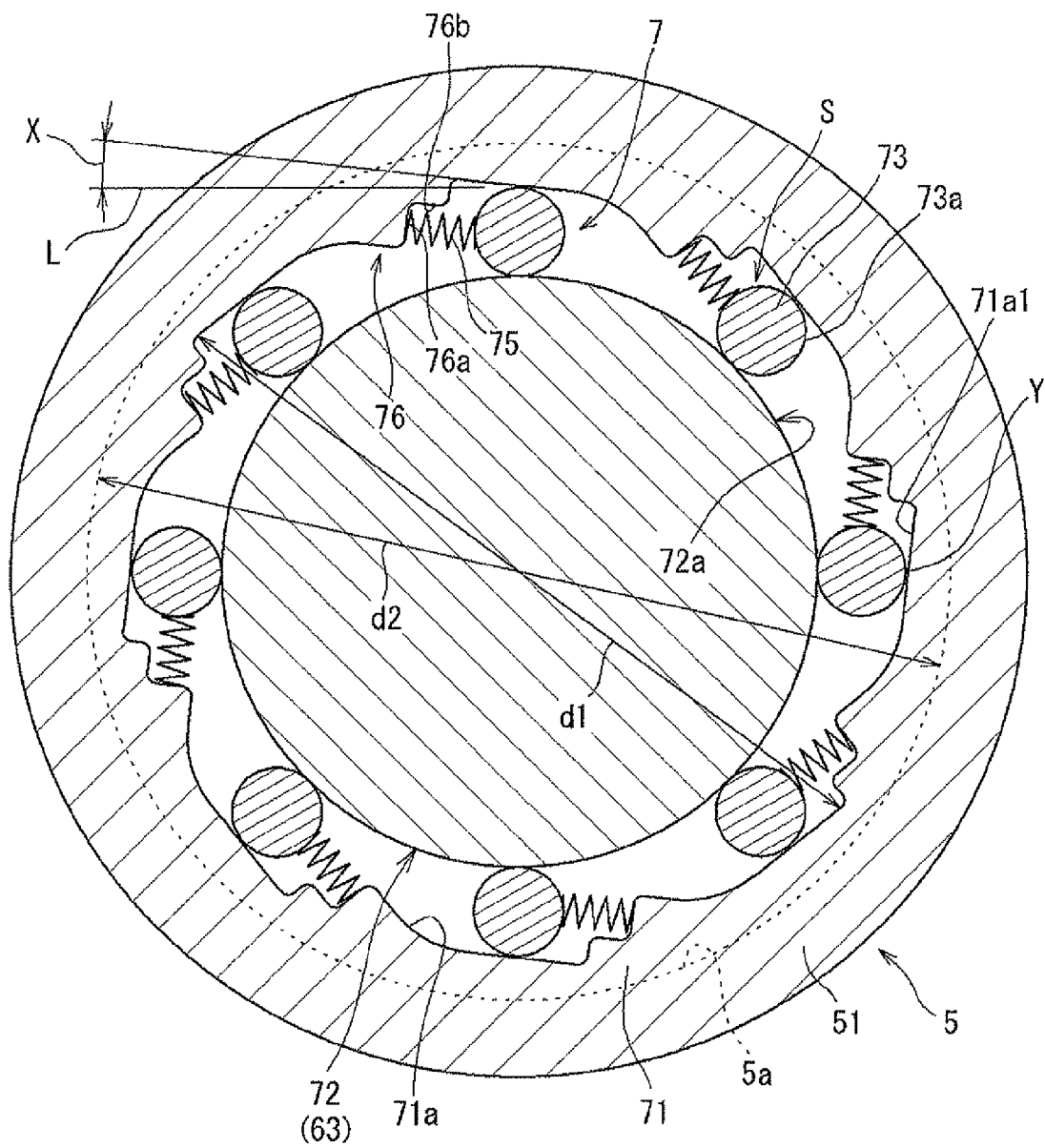
FIG. 8 is a sectional view that shows a one-way clutch according to the embodiment shown in FIG. 7.
Figure 9:
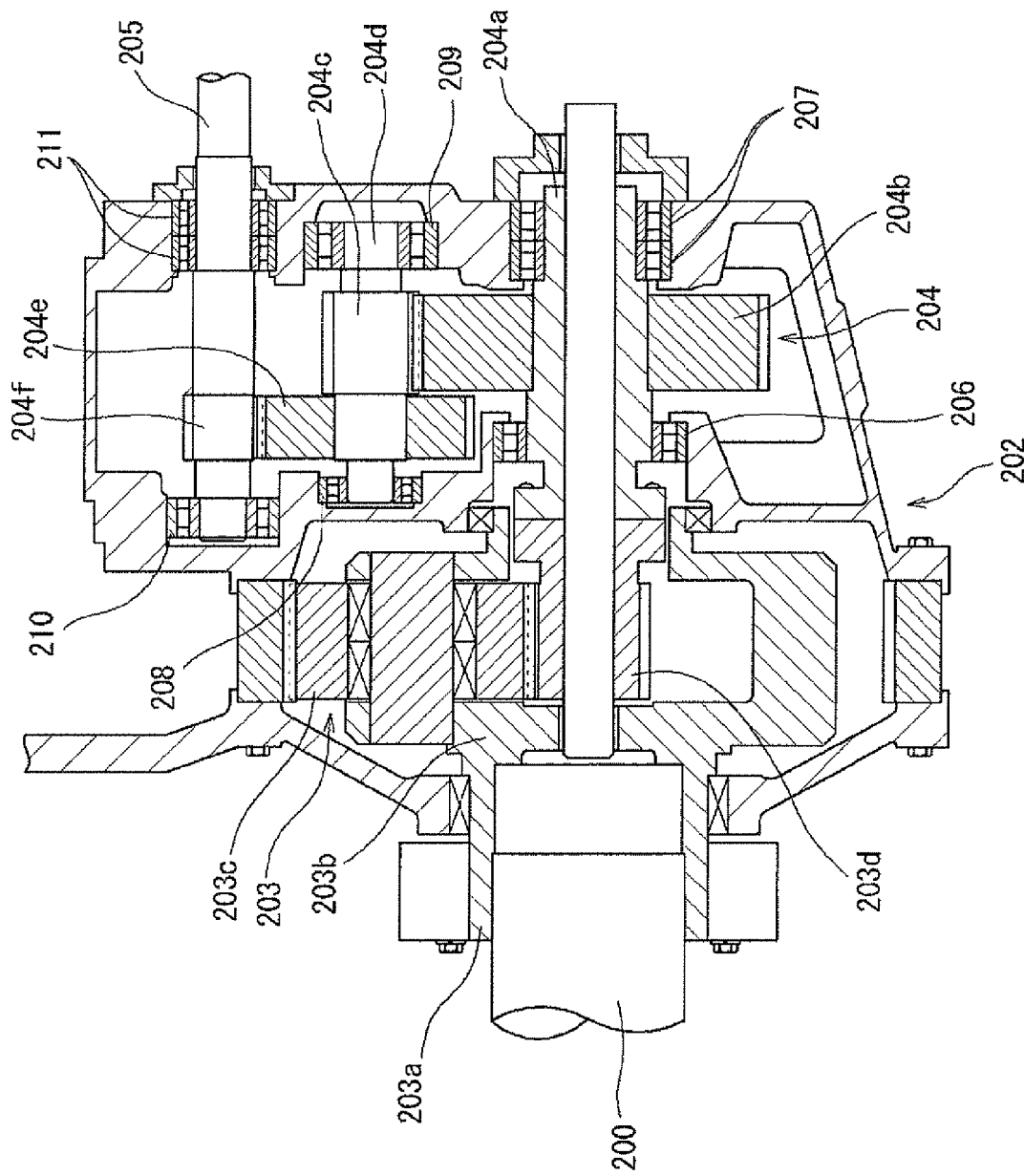
FIG. 9 is a sectional view that shows a conventional speed increaser.

FIG. 7 is a sectional view that shows further another embodiment of a coupling portion between the output shaft of the speed increaser and the drive shaft of the generator. FIG. 8 is a sectional view that shows a one-way clutch in the embodiment shown in FIG. 7. The present embodiment mainly differs from the embodiment shown in FIG. 3 and FIG. 4 in the configuration of the one-way clutch 7, and the same portions as those in the embodiment shown in FIG. 3 are denoted by the same reference numerals as those in the embodiment shown in FIG. 3.

As shown in FIG. 7 and FIG. 8, the outer ring 71 of the one-way clutch 7 is formed integrally with an inner periphery 5a of the input rotor 5 arranged radially outward of the outer ring 71. The outer ring cam surfaces 71a1 that form the wedge-shaped spaces S are formed in the inner periphery 71a of the outer ring 71. The maximum inside diameter d1 (inside diameter at points that are farthest from the tangent L outward in the radial direction) of the outer ring cam surfaces 71a is set smaller than or equal to an inside diameter d2 of the inner periphery 5a (surface on which the outer rings 81 of the rolling bearings 8 are press-fitted) of the input rotor 5.

The outer ring cam surfaces 71a set to the above-described size may be formed by cold forging or drawing. For example, when the input rotor 5 is formed by cold forging, the inner periphery 5a and the outer ring 71 are formed integrally with each other, and then a punch formed to have a diameter smaller than or equal to the inside diameter d2 of the inner periphery 5a is inserted from one end side of the input rotor 5 along the inner periphery 5a. Thus, it is possible to form the outer ring cam surfaces 71a in the inner periphery 71a of the outer ring 71 at the same time. Therefore, it is not necessary to form the outer ring cam surface 71a1 in the inner periphery 71a of the outer ring 71 one by one by cutting. Therefore, it is possible to easily form the outer ring cam surfaces 71a.

As shown in FIG. 8, contact portions 76 are integrally formed with the inner periphery 71a of the outer ring 71. In a state where one end portion of each elastic member 75 is in contact with the corresponding roller 73, the other end portion of the elastic member 75 contacts the corresponding contact portion 76. Each contact portion 76 is formed continuously from the circumferential one end portion of the corresponding outer ring cam surface 71a, and is formed so as to protrude radially inward. Each contact portion 76 has a contact surface 76a and a restricting surface 76b. The other end portion of each elastic member 75 contacts the corresponding contact surface 76a. Each restricting surface 76b restricts radially outward movement of the corresponding elastic member 75 in contact with the corresponding contact surface 76a due to centrifugal force. Thus, each elastic member 75 is retained in a state where respective end portions of the elastic member 75 are in contact with the inner periphery 71a of the outer ring 71 and the corresponding roller 73. Therefore, the one-way clutch 7 according to the present embodiment includes no cage 74 shown in FIG. 3, to which the elastic members 75 are attached.

The present embodiment is described as a modified example of the embodiment shown in FIG. 3. Alternatively, the present embodiment may be implemented as a modified example of the embodiment shown in FIG. 5. In this case, the maximum inside diameter of the outer ring cam surfaces 71a1 formed in the inner periphery of the region B of the output rotor 60 just needs to be set smaller than or equal to the inside diameter of the inner periphery of each of the regions A, C of the output rotor 60. In the present embodiment, the elastic members 75 of the one-way clutch 7 are retained by the respective contact portions 76 formed in the outer ring inner periphery 71a. Alternatively, the elastic members 75 of the one-way clutch 7 may be retained by the cage 74 as in the embodiment shown in FIG. 4.

With the thus configured one-way clutch 7 as well, similar operation and advantageous effects to those of the one-way clutch 7 shown in FIG. 3 are obtained. Particularly, in the present embodiment, the outer ring inner periphery 71a of the one-way clutch 7 is integrally formed with the inner periphery 5a of the input rotor 5. Therefore, it is possible to use the input rotor 5 as the outer ring 71 of the one-way clutch 7. Thus, it is possible to simplify the structure of the device as a whole. Because the maximum inside diameter d1 of the outer ring cam surfaces 71a1 is set smaller than or equal to the inside diameter d2 of the inner periphery 5a of the input rotor 5, it is possible to easily form the outer ring cam surfaces 71a by cold forging or drawing as described above. The contact portions 76 are formed in the outer ring inner periphery 71a of the one-way clutch 7. In a state where the one end portion of each elastic member 75 is in contact with the corresponding roller 73, the other end portion of the elastic member 75 contacts the corresponding contact portion 76. Therefore, it is possible to retain each elastic member 75 between the corresponding roller 73 and the corresponding contact portion 76. Thus, no cage is required to retain the elastic members 75. Therefore, it is possible to further simplify the structure of the device as a whole.

The invention is not limited to the above-described embodiments. The invention may be implemented in various other modified embodiments. For example, in the above-described embodiments, the input rotor and the output rotor are provided as members formed separately from the output shaft and the drive shaft, respectively. Alternatively, the input rotor and the output rotor may be integrally formed with the output shaft and the drive shaft, respectively. The rolling bearings arranged between the input rotor and the output rotor are cylindrical roller bearings in order to allow the output rotor to move in the axial direction. When the output rotor is not moved in the axial direction, the rolling bearings arranged between the input rotor and the output rotor may be ball bearings.

The power generating apparatus according to the above-described embodiments is used in the case where wind force is used as external force. Alternatively, the invention may also be applied to a power generating apparatus that generates electric power by using other external force, such as hydraulic power and thermal power.

With the power generating apparatus according to the invention, it is possible to effectively suppress occurrence of smearing at the roller bearing that supports the output shaft of the speed increaser and to prevent abnormal rotation of the drive shaft of the generator.

What is claimed is:
1. A power generating apparatus including: a main shaft that is rotated by external force; a speed increaser that has a rotation transmission mechanism that receives rotation of the main shaft and that increases a speed of the rotation and a roller bearing that supports an output shaft, which outputs rotary torque of the rotation transmission mechanism, such that the output shaft is rotatable; and a generator that has a drive shaft that rotates upon reception of rotation of the output shaft and that generates electric power due to rotation of a rotor that rotates together with the drive shaft, comprising:

an input rotor provided so as to be rotatable together with the output shaft;

an output rotor provided so as to be rotatable together with the drive shaft and arranged concentrically with and radially inward or radially outward of the input rotor;

a one-way clutch that is arranged between the input rotor and the output rotor, that connects the input rotor and the output rotor to each other such that the input rotor and the output rotor are rotatable together with each other in a state where a rotation speed of the input rotor is higher than a rotation speed of the output rotor, and that disconnects the input rotor and the output rotor from each other in a state where the rotation speed of the input rotor is lower than the rotation speed of the output rotor; and a rotation speed limiter that disconnects the input rotor and the output rotor from each other when the rotation speed of the output shaft exceeds a predetermined value in a state where the input rotor and the output rotor are connected to each other.

2. The power generating apparatus according to claim 1, wherein:

the one-way clutch includes: an inner ring outer periphery; an outer ring inner periphery; a plurality of rollers respectively arranged in a plurality of wedge-shaped spaces defined between the inner ring outer periphery and the outer ring inner periphery; and springs that urge the respective rollers in one direction to cause the rollers to engage with the inner ring outer periphery and the outer ring inner periphery, the one-way clutch connects the input rotor and the output rotor to each other such that the input rotor and the output rotor are rotatable together with each other through engagement of the rollers with the inner ring outer periphery and the outer ring inner periphery, the one-way clutch disconnects the input rotor and the output rotor from each other by disconnecting the rollers from the inner ring outer periphery and the outer ring inner periphery, and when the rotation speed of the output shaft exceeds the predetermined value in a state where the rollers of the one-way clutch are engaged with the inner ring outer periphery and the outer ring inner periphery, the rotation speed limiter disengages the rollers from the inner ring outer periphery and the outer ring inner periphery by moving the rollers due to centrifugal force against urging force of the springs.

3. The power generating apparatus according to claim 2, wherein the outer ring inner periphery of the one-way clutch is integrally formed with an inner periphery of the input rotor or the output rotor, which is arranged radially outward of the one-way clutch.

4. The power generating apparatus according to claim 3, wherein outer ring cam surfaces that respectively form the wedge-shaped spaces are formed in the outer ring inner periphery, and a maximum inside diameter of the outer ring cam surfaces is set smaller than or equal to an inside diameter of the inner periphery formed integrally with the outer ring inner periphery.

5. The power generating apparatus according to claim 3, wherein contact portions are formed in the outer ring inner periphery of the one-way clutch, and, in a state where one end portions of the springs are in contact with the respective rollers, the other end portions of the springs contact the respective contact portions.

6. The power generating apparatus according to claim 4, wherein contact portions are formed in the outer ring inner periphery of the one-way clutch, and, in a state where one end portions of the springs are in contact with the respective rollers, the other end portions of the springs contact the respective contact portions.

7. The power generating apparatus according to claim 2, further comprising a rolling bearing that is arranged between the input rotor and the output rotor and that supports the input rotor and the output rotor such that the input rotor and the output rotor are rotatable relative to each other.

8. The power generating apparatus according to claim 3, further comprising a rolling bearing that is arranged between the input rotor and the output rotor and that supports the input rotor and the output rotor such that the input rotor and the output rotor are rotatable relative to each other.

9. The power generating apparatus according to claim 4, further comprising a rolling bearing that is arranged between the input rotor and the output rotor and that supports the input rotor and the output rotor such that the input rotor and the output rotor are rotatable relative to each other.

10. The power generating apparatus according to claim 7, wherein the one-way clutch includes an annular cage that retains the rollers arranged at predetermined intervals in a circumferential direction, and a pair of the rolling bearings are arranged on respective axial sides of the one-way clutch such that respective axial end faces of the cage of the one-way clutch are allowed to contact axial end portions of the respective rolling bearings.

11. The power generating apparatus according to claim 8, wherein the one-way clutch includes an annular cage that retains the rollers arranged at predetermined intervals in a circumferential direction, and a pair of the rolling bearings are arranged on respective axial sides of the one-way clutch such that respective axial end faces of the cage of the one-way clutch are allowed to contact axial end portions of the respective rolling bearings.

12. The power generating apparatus according to claim 10, wherein each of the rolling bearings is a cylindrical roller bearing that has a plurality of cylindrical rollers and rib portions with which end faces of each cylindrical roller are in sliding contact, and axial end faces of the cage of the one-way clutch contact the rib portions of the respective cylindrical roller bearings.

13. The power generating apparatus according to claim 11, wherein each of the rolling bearings is a cylindrical roller bearing that has a plurality of cylindrical rollers and rib portions with which end faces of each cylindrical roller are in sliding contact, and axial end faces of the cage of the one-way clutch contact the rib portions of the respective cylindrical roller bearings.

14. The power generating apparatus according to claim 12, wherein the inner ring outer periphery of the one-way clutch is a cylindrical surface, each of the cylindrical roller bearings has an inner ring raceway surface on which the cylindrical rollers roll, the output rotor is arranged radially inward of the input rotor, and the inner ring outer periphery of the one-way clutch and the inner ring raceway surfaces of the cylindrical roller bearings are formed on an outer periphery of the output rotor.

15. The power generating apparatus according to claim 13, wherein the inner ring outer periphery of the one-way clutch is a cylindrical surface, each of the cylindrical roller bearings has an inner ring raceway surface on which the cylindrical rollers roll, the output rotor is arranged radially inward of the input rotor, and the inner ring outer periphery of the one-way clutch and the inner ring raceway surfaces of the cylindrical roller bearings are formed on an outer periphery of the output rotor.

16. The power generating apparatus according to claim 12, wherein the outer ring inner periphery of the one-way clutch is a cylindrical surface, each of the cylindrical roller bearings has an outer ring raceway surface on which the cylindrical rollers roll, the output rotor is arranged radially outward of the input rotor, and the outer ring inner periphery of the one-way clutch and the outer ring raceway surfaces of the cylindrical roller bearings are formed on an inner periphery of the output rotor.

17. The power generating apparatus according to claim 13, wherein the outer ring inner periphery of the one-way clutch is a cylindrical surface, each of the cylindrical roller bearings has an outer ring raceway surface on which the cylindrical rollers roll, the output rotor is arranged radially outward of the input rotor, and the outer ring inner periphery of the one-way clutch and the outer ring raceway surfaces of the cylindrical roller bearings are formed on an inner periphery of the output rotor.

18. The power generating apparatus according to claim 14, wherein the output rotor is detachably fixed to the drive shaft, and is arranged so as to be movable in an axial direction with respect to the input rotor.

19. The power generating apparatus according to claim 16, wherein the output rotor is detachably fixed to the drive shaft, and is arranged so as to be movable in an axial direction with respect to the input rotor.

* * * * *